United States Patent Office 3,052,550
Patented Sept. 4, 1962

3,052,550
SUCROSE INVERSION OF DEGLET NOOR DATES
Vincent P. Maier, Monrovia, Calif., assignor to the United
States of America as represented by the Secretary of
Agriculture
No Drawing. Filed Aug. 25, 1961, Ser. No. 135,407
4 Claims. (Cl. 99—100)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of methods for improving the properties of dates, particularly those of the Deglet Noor variety. Another object of the invention is the provision of the treated dates as new articles of manufacture. Further objects of the invention will be evident from the following description wherein parts and percentages are by weight unless otherwise specified.

The principal date variety grown in the desert southwest region of this country is the Deglet Noor. This variety is noted for high yields, excellent eating quality, and good shipping characteristics. However, a significant problem involved in the production and sale of this variety is concerned with texture. Thus when the dates are reduced to a moisture content low enough to avoid mold growth, the tissue is too firm and fibrous for complete consumer acceptance. Another problem associated with these dates is that they exhibit a characteristic tendency to lose moisture readily when they are exposed to a dry atmosphere. This property is ascribed to the fact that the dates have a high equilibrium relative humidity. Thus, when they are stored in a dry atmosphere, they tend to lose moisture rapidly whereby they become tough or even hard and flinty. This drying-out effect is particularly noticed where the dates are packed with cereal products such as cornflakes, bran, or other breakfast-cereal products. In such cases the atmosphere within the package is relatively low in humidity and there occurs a translocation of moisture from the dates to the cereal, resulting in the aforesaid hardening of the date tissue. Under these circumstances, if the date-containing cereal stands on the grocer's shelf for any appreciable time the dates become tough and the taste-appeal of the mixed cereal-fruit product is vitiated. It is to be realized that in this phenomenon of dehydration the equilibrium relative humidity of the fruit is of vital concern as it is in effect the driving force which causes the moisture transfer. Thus the higher the equilibrium relative humidity of the fruit, the greater will be the driving force and the faster will be the desiccation of the fruit tissue. This point can be further elucidated by a specific example. Let it be assumed that one has two samples of different fruit materials. Sample A has an equilibrium relative humidity of 90%. (This value signifies that when the material is held in contact with an atmosphere having a relative humidity of 90%, it will neither gain nor lose moisture.) Sample B has an equilibrium relative humidity of 50%. Now if both of these samples are subjected to an atmosphere having a relative humidity of 45%, sample A will lose moisture very rapidly because of the large driving force—the difference between 90% and 45%. On the other hand sample B will lose moisture very slowly because of the slight driving force represented by the difference between 50% and 45%. It may further be observed that equilibrium relative humidity is not a constant, even with the same fruit material, but varies depending on the moisture content of the tissue. Normally, any particular fruit material will exhibit a higher equilibrium relative humidity at higher moisture levels.

In accordance with the invention the properties of dates are improved by application of relatively simple procedures. One result of the invention is that the texture of the date tissue is made softer. Simultaneously, the equilibrium relative humidity of the dates is decreased. The net result is that the dates (1) have a softer and more desirable texture for direct eating even if they are dehydrated to levels at which mold growth is avoided and (2) they exhibit a decreased tendency to lose moisture when stored in a dry atmosphere so that they are more suitable for incorporation with cereal products as in preparing mixed date-cereal breakfast foods. The data in Examples III and IV, below, illustrate the improvements in texture and moisture-retaining ability achieved by the invention.

The basis of the procedure of the invention is that the sucrose naturally present in the date tissue is largely converted into invert sugar. For reasons not presently understood, this sucrose inversion is accompanied by a marked softening of the tissue as well as a marked reduction of the equilibrium relative humidity thereof. Accordingly, the dates processed in accordance with the invention can be reduced to relatively low moisture levels so that they may be stored and shipped without danger of spoilage yet have a desirably soft texture so that they are admirably suited for direct eating out of the package. Moreover, because of the decreased equilibrium relative humidity of the products of the invention they exhibit a greater resistance to becoming desiccated when exposed to dry atmospheric conditions and are thus better adapted for applications where dates are to be admixed with cereals or other dry ingredients, e.g., breakfast food cereals, flours, cake mixes, etc. A further significant advantage of the invention is that the above-described changes of texture and moisture-transference properties are achieved without deleterious effects on the dates. Thus, although the texture of the dates is softened, there is no damage to the cellular structure, appearance, or form of the dates and there is no loss of nutrients. During the process of the invention certain changes occur in flavor and color. These, however, are desirable changes. Thus the flavor of the products of the invention is similar to that of invert varieties of dates, this flavor being sometimes characterized as a caramel flavor. Also the color of the dates deepens to a medium brown color which is considered by the industry to be a desirable one, preferable to the pale yellow-brown color frequently observed in mature Deglet Noor dates.

As explained hereinabove, the basis of the invention is the inversion of the sucrose in the date tissue. This inversion can be accomplished in a variety of different ways. In the preferred method, the sucrose-inverting enzyme naturally present in the date tissue is utilized as the catalyst for effecting the desired chemical changes. The desired result is attained by a procedure wherein the dates containing their natural complement of sucrose-inverting enzyme are held under controlled conditions of moisture content, temperature, and humidity favorable for the action of the naturally occurring enzyme to take place. Thus in a typical embodiment of the invention, the dates to be treated are brought to a moisture level ranging about from 26 to 32%. This step may be accomplished in any of the conventional ways. For example, if the dates have a lower moisture content than required they may be exposed to a humid atmosphere until they pick up the desired amount of moisture. Another plan involves subjecting the dates to a vacuum while they are immersed in water. Having thus adjusted the moisture content of the dates they are then held in an atmosphere having a temperature about from 130 to 140° F. and a relative humidity about from 70 to 80% until the desired sucrose inversion takes place. The time of holding will vary depending on several factors. For example, at higher moisture levels the rate of sucrose inversion is increased. Also, higher temperatures increase the rate of sucrose inversion, this fact being illustrated by the following information: At 100° F. it takes 111 hours to invert 50% of the sucrose in 31% moisture-content dates whereas at 140° F. it takes only 17.5 hours. Thus a forty degree rise in temperature (from 100 to 140° F.) causes the sucrose inversion to proceed 6.3 times faster. Another fact which influences the rate of sucrose inversion is the state of the dates, that is, whether they are whole, pitted, or cut into pieces. Sucrose inversion is slowest with the whole dates and increases when the tissue is bruised, cut, or otherwise disorganized as is the case with pitted, diced, or chopped dates. In any particular instance, the proper period of holding can be ascertained by testing the product from time to time to note the progress of the sucrose inversion. Usually the treatment is complete when the invert sugar content is at least 60%, preferably 70–75%, of the total sugars on a dry weight basis. It is further to be noted that by applying the conditions herein described (holding dates at a moisture content of 26–32% in an atmosphere having a temperature of 130–140° F. and a relative humidity of 70–80%) the sucrose inversion takes place at such a rapid rate that the procedure has real practical value. In typical embodiments of the invention, pitted dates hydrated to 31% moisture and held at 140° F. and 75% relative humidity for about 35 to 48 hours contained about 75% invert sugar based on the total dry weight of sugars. With chopped or ground dates, similar results were achieved in as little as 15 hours.

During the holding period described above wherein the sucrose inversion is accomplished, it is usually preferred that a preservative agent be present to avoid possibility of fermentation of the date tissue. The nature of the preservative used is not a critical factor and any of the preservatives generally useful in food applications may be employed. Illustrative examples of preservatives which may be employed are potassium sorbate, sodium benzoate, dehydroacetic acid, ethylene oxide, propylene oxide, butadiene dioxide, or the like. The preservative is applied to the dates before the holding period is started, using conventional techniques. For example, such compounds as potassium sorbate, sodium benzoate and dehydroacetic acid are applied by dipping the fruit for a minute or two in a dilute solution (about 1%) of the preservative. Ethylene oxide and propylene oxide may be applied in vapor or dissolved form. For example, the fruit may be placed in a closed chamber wherein it is exposed to the vapors produced by the alkylene oxide added in an amount of about 1 ml. per pound of fruit. In the alternative, the fruit may be dipped for a minute or two in a dilute (about 0.2%) solution of the alkylene oxide. It is to be noted that the use of the preservative is essentially a precautionary measure and in plants where good sanitation is followed, and especially if the dates are dried to a moisture content below 23% immediately after the inversion treatment, the preservative may be omitted.

Following the treatment described above wherein the sucrose inversion is attained, the dates are usually dehydrated. The final level of moisture content to which they are adjusted depends on the desire of the operator and the use to be made of the product. Generally, where the product is to be sold for the usual out-of-hand eating and cooking purposes, the dates are brought to a final moisture content of about 18 to 22%. This dehydration may be achieved in any of the conventional ways as known in the industry. One plan is to reduce the humidity of the atmosphere in which the dates are being held, preferably to below 20%, while keeping the temperature at about 130–140° F. Such a method will require about 12 hours for the dehydration. Faster procedures may be used such as exposing them to a draft of hot air in a tunnel or cabinet drier. If the products are to be sold at a moisture condition of less than 18%, the more rapid drying systems are preferred. Thus for example, in a tunnel drying system using air at 160–175° F., the dates may be dried to 3% moisture content in 20 to 24 hours. Often products having a moisture content of 6 to 10% are produced for incorporation with cereal products such as corn flakes, bran, or the like, as breakfast foods.

In accordance with the above-described preferred procedure, the sucrose inversion is accomplished by the enzymes naturally present in the fruit tissue. If desired, however, the process of inversion can be accelerated by applying to the dates sucrose-inverting enzyme obtained from other sources, e.g., from yeast or suitable molds. To this end, the dates, prior to subjecting them to the holding treatment described above, may be soaked in a solution of the enzyme or the date tissue can be impregnated with the enzyme solution by conventional vacuum infiltration techniques. It is further obvious that this modification of the invention is of particular usefulness in situations where the dates have received such prior treatment that their natural complement of sucrose-inverting enzyme is reduced, impaired, or eliminated.

As explained hereinabove the process of the invention is especially adapted to the treatment of Deglet Noor dates. This variety of dates is characterized by the fact that the principal sugar in the tissue is sucrose—usually about 52% of the dry weight. However, the invention is equally applicable to other varieties of dates which have sucrose as a principal sugar—such dates being herein referred to as sucrose-type dates. Thus, for example, the invention may be applied to such varieties as Deglet Beidha, Kinta, Thuuri, and the like.

The invention is further demonstrated by the following illustrative examples.

*Example I*

A lot of Deglet Noor dates were pitted, then exposed to saturated air at 100° F. until the moisture content of the dates was 31%.

The hydrated dates were then placed in a chamber where they were exposed for 3 hours to the vapors of ethylene oxide, 0.2 ml. per pound of fruit. The preservative-treated fruit was then placed in a room wherein the atmosphere was held at 140° F. and a relative humidity of 75%. From time to time, samples of the fruit were withdrawn and tested for sucrose inversion. The results are tabulated below:

| Time of Holding at 140° F. and 75% R.H., hrs. | Invert Sugar, percent of Total Sugars |
|---|---|
| 0 | 38.0 |
| 15.5 | 59.0 |
| 24.0 | 69.0 |
| 34.5 | 76.1 |

*Example II*

Ground Deglet Noor dates were hydrated and treated with ethylene oxide as in Example I, then held in a room with an atmosphere maintained at 140° F. and 75% relative humidity. The results are tabulated below:

| Holding time at 140° F. and 75% R.H., hrs. | Invert Sugar, percent of Total Sugars |
|---|---|
| 0 | 38.0 |
| 15.5 | 70.0 |
| 24 | 83.3 |
| 28.5 | 93.3 |

*Example III*

A sample of pitted Deglet Noor dates treated in accordance with the invention and a sample of the untreated dates, both at the same moisture level, were subjected to tests to determine their texture. In these tests the force required to shear the dates was measured. The results are tabulated below:

|  | Dates treated in accordance with invention | Untreated dates |
| --- | --- | --- |
| Moisture, percent | 21.6 | 21.6 |
| Invert sugar, percent of total sugars | 62.0 | 31.0 |
| Shear force, lbs | 84 | 111 |

The above information illustrates the improvement in texture afforded by the invention in that a typical product of the invention can be sheared with 76% of the force required to shear the untreated dates at the same moisture level.

*Example IV*

Deglet Noor date pieces treated in accordance with the invention and untreated date pieces were adjusted to approximately the same relative humidity by holding them in atmospheres of controlled moisture content. The properties of the two samples were then measured. The results are set forth below:

|  | Dates treated in accordance with invention | Untreated dates |
| --- | --- | --- |
| Invert sugar, percent of total sugars | 69.0 | 37.3 |
| Equilibrium relative humidity, percent | 39.5 | 41.0 |
| Moisture content, percent | 7.83 | 6.23 |
| Pressure,[1] lbs | 10.6 | 16.3 |

[1] Pressure, applied by a blunt probe, required to flatten the date material.

The above information demonstrates the softer texture of the treated dates and also illustrates the fact that the treated dates have such a low equilibrium relative humidity that even if they contain a higher proportion of moisture than untreated dates they will still exhibit a lesser equilibrium relative humidity than the untreated dates. Thus, although the treated dates contain 1.25 times as much water as the untreated dates, their equilibrium relative humidity is somewhat less than that of the untreated fruit. This is an unexpected result because ordinarily the equilibrium relative humidity of fruit materials increases with increase in moisture content.

Having thus described the invention, what is claimed is:

1. A method for improving the properties of sucrose-type dates which comprises adjusting the moisture content of such dates to a level of about 26 to 32% and holding the dates in an atmosphere having a temperature of about 130–140° F. and a relative humidity of about 70 to 80% until the sucrose originally present is inverted to the extent that there is present at least 60% invert sugar, based on the dry weight of total sugar content.

2. The method of claim 1 wherein the dates are of the Deglet Noor variety.

3. The process of claim 1 wherein the sucrose-inversion is catalyzed solely by the sucrose-inverting enzyme naturally present in the date tissue.

4. The process of claim 1 wherein the sucrose-inversion is expedited by applying added sucrose-inverting enzyme to the date tissue.

References Cited in the file of this patent

UNITED STATES PATENTS

| 1,391,683 | Herzfeld | Sept. 27, 1921 |
| 2,591,213 | Stupin | Apr. 1, 1952 |